Feb. 3, 1925.
W. J. DONALDSON
PICTURE EXHIBITOR FOR TALKING MACHINES
Filed Nov. 12, 1921
1,524,856
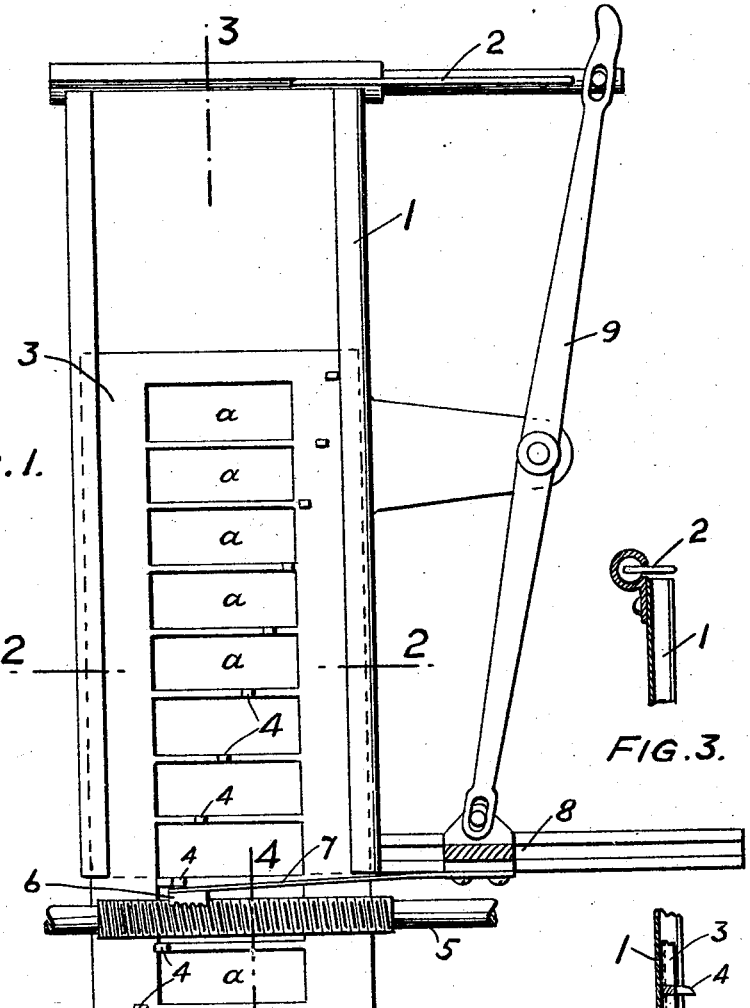
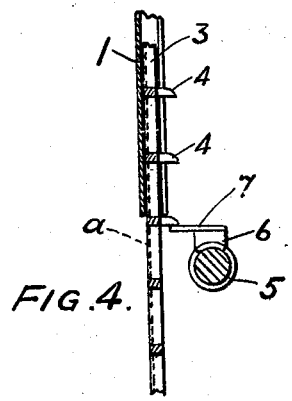
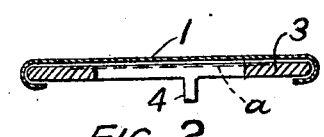
INVENTOR
William J. Donaldson
BY
Augustus B. Stoughton.
ATTORNEY
WITNESS:

Patented Feb. 3, 1925.

1,524,856

UNITED STATES PATENT OFFICE.

WILLIAM J. DONALDSON, OF PHILADELPHIA, PENNSYLVANIA, ASSIGNOR TO THE VISUALATONE CORPORATION, OF PHILADELPHIA, PENNSYLVANIA, A CORPORATION OF DELAWARE.

PICTURE EXHIBITOR FOR TALKING MACHINES.

Application filed November 12, 1921. Serial No. 514,499.

*To all whom it may concern:*

Be it known that I, WILLIAM J. DONALDSON, a citizen of the United States, residing at Philadelphia, in the county of Philadelphia and State of Pennsylvania, have invented a new and useful Improvement in Picture Exhibitors for Talking Machines, of which the following is a specification.

The principal objects of the present invention are, first, to provide an improvement in picture slides and in the mechanism by which they are operated from the talking machine whereby cost is reduced and operation improved; and second, to provide for avoiding confusion among the slides and permitting of the application and use of the slides singly and in such a way that one must be completely displayed before another is introduced.

To these and other ends hereinafter set forth and, generally stated, the invention comprises a picture slide provided on its face with obliquely disposed projections by which the slide is stopped and released and by the individual disposition of which in respect to the others the duration of the dwell in the movement of the slide is determined, and the invention further consists in connection with such a picture slide of mechanism for actuating it as will be hereinafter described. The invention further comprises the improvements to be presently described and finally claimed and in the description of the improvement reference will be made to the accompanying drawing forming part hereof and in which—

Figure 1 is a front elevational view of mechanism embodying features of the invention.

Fig. 2 is a section on the line 2—2 of Figure 1.

Fig. 3 is a section on the line 3 of Figure 1, and

Fig. 4 is a section on the line 4 of Figure 1.

In the drawings 1 is a chute having at its top a movable cover 2 arranged to slide and close and open the entrance of the chute 1. 3 is a picture slide provided on its face with obliquely disposed stop projections 4 for stopping the slide in order to exhibit a picture and for releasing the slide to exhibit a succeeding picture and for fixing the duration of the dwell in the movement of the slide or period during which a picture is exhibited, and this period or dwell corresponds with the time consumed by the phonograph or talking machine in making the reproduction appropriate to the picture being exhibited. The phonograph or talking machine is not shown because it is too well understood to require description. It may be said that, as shown in the drawings, the slide is of generally ladder-like construction and the pictures are indicated at *a*. 5 is a screw shaft turning in synchronism with the talking machine. The connections by which the shaft 5 is turned from the talking machine are not shown since they are well understood by those skilled in the art, and it is sufficient to say that the shaft 5 is driven by or from the motor of the talking machine. 6 is a segmental nut adapted to travel across the face of the slide and to successively engage the stop projections 4 to cause a dwell in the movement of the slide and to fix the duration of the dwell for each picture, and the latter result is accomplished by the location in the drawings of the righthand vertical edge of the stop projection. As long as the segmental nut underlies a projection the slide is at rest, and when the segmental nut passes toward the right in the drawing beyond the righthand edge of a stop, the nut releases the projection and the slide falls until a succeeding projection engages the segmental nut and in that way arrests the slide. Evidently the dwells in the movement of the slide can be made longer or shorter according to the location of the righthand vertical edges, and in the drawings, of the stop projections, and in practice the stop projections are disposed in such oblique arrangement that the dwells in the movement of the slide will cause pictures to be exhibited during the phonographic reproduction appropriate to them.

7 is a spring support adapted to normally disengage the segmental nut 6 from the screw 5 and to yield and permit such engagement in response to the weight of a slide acting on the segmental nut. The spring support is slidably mounted as in ways 8.

9 is a connection shown as a centrally pivoted hand lever, and it is introduced between the slidably mounted spring support 7 and the cover. When the segmental nut reaches its extreme righthand position in the drawings, the cover 2 is closed through the intervention of the lever 9, the slide drops out of the chute, and the segmental nut is out of engagement with the screw. Another slide may not be introduced into the chute until the hand lever 9 is moved toward the right in the drawings, thus opening the entrance of the chute and restoring the segmental nut to its initial or lefthand position ready to be brought into engagement with the screw shaft when another picture slide is introduced.

In use the shaft 5 turning in synchronism with the talking machine motor drives the segmental nut from left to right in the drawings, thus a picture slide is fed intermittently to display succeeding pictures, and the position of the stop projections on the face of the picture slide controls the dwell in the feed. When a picture slide has been fully exhibited the entrance to the picture chute is closed and another picture slide cannot be introduced until the entrance is opened by moving its cover 2. In moving its cover 2 the segmental nut is returned from the postion at the end of its travel to the position at the beginning of its travel, thus the return of the segmental nut is insured prior to the introduction of each picture slide.

It will be obvious to those skilled in the art that modifications may be made in details of construction and arrangement without departing from the spirit of the invention which is not limited as to those matters or otherwise than the prior art and the appended claims may require:

I claim:

1. A picture slide for picture exhibitors for talking machines provided on its face with obliquely disposed stop projections extending crosswise of the face of the slide.

2. A picture exhibitor for talking machines comprising in combination a chute, a picture slide having on its face obliquely arranged stop projections, and a nut and screw for co-operation with the projections, substantially as described.

3. A picture exhibitor for talking machines comprising in combination a chute, a picture slide having on its face obliquely arranged stop projections, a screw, a segmental nut co-operating with the projections for intercepting the slide, and means for returning the nut from the end to the beginning of its travel.

4. A picture exhibitor for talking machines comprising in combination a chute, a picture slide having on its face obliquely arranged stop projections, a screw, a segmental nut co-operating with the projections for intercepting the slide, and a traveler provided with a spring to which the nut is connected.

5. A picture exhibitor for talking machines comprising in combination a chute having at its top a movable cover, a picture slide provided on its face with obliquely disposed stop projections, a screw shaft synchronous with the talking machine, a segmental nut adapted to co-operate with the projections, a slidably mounted spring support for the nut, and means by which the cover and nut are operatively connected.

WILLIAM J. DONALDSON.